United States Patent [19]

Jimenez

[11] Patent Number: 4,743,468
[45] Date of Patent: May 10, 1988

[54] METHOD FOR REPAIRING A RUPTURE IN A METAL OR PLASTIC SURFACE

[75] Inventor: Rene C. Jimenez, Tampa, Fla.

[73] Assignee: Renbec International Corp., Tampa, Fla.

[21] Appl. No.: 10,724

[22] Filed: Feb. 4, 1987

[51] Int. Cl.$^4$ .......................................... B32B 35/00
[52] U.S. Cl. ................................. 427/140; 156/94; 427/142; 427/201; 427/202; 427/388.1; 427/393.5
[58] Field of Search ............... 427/140, 142, 202, 201, 427/284, 385.5, 388.1, 393.5, 389.9; 156/94, 97, 98

[56] References Cited

U.S. PATENT DOCUMENTS

| | | | |
|---|---|---|---|
| 4,025,677 | 5/1977 | Belke ..................................... | 156/94 |
| 4,215,173 | 7/1980 | Hubbard .............................. | 427/325 |
| 4,405,750 | 9/1983 | Nakata et al. ....................... | 524/850 |
| 4,659,589 | 4/1987 | Jimenez .............................. | 427/202 |

Primary Examiner—Sadie L. Childs
Attorney, Agent, or Firm—Walter J. Monacelli

[57] ABSTRACT

In repairing a rupture as described herein the rupture is covered by a patch of metal or plastic sheet material which covers the rupture at least ½ inch beyond the rupture, then applying over the edge of the patch a layer of an alpha-cyanoacrylate which is liquid at 20° C. and has the formula $CH_2=C(CN)—COOR$ wherein R is a hydrocarbon radical selected from the group consisting of aliphatic, aromatic and cycloaliphatic hydrocarbon groups of 1–10 carbon atoms and alkoxy, chloro and fluoro derivatives of said hydrocarbon groups in which alkoxy groups there are 1–4 carbon atoms therein, this layer covering the adjacent areas of the covering patch and of the ruptured surface each for a distance of at least ¼ inch from the edge of the covering patch and all around said patch and spreading on said added layer of alpha-cyanoacrylate a layer of a powdered solid selected from a group consisting of (i) a compound having hydroxyl, carboxylate or both hydroxyl and carboxylate groups therein and (ii) rubber.

58 Claims, 1 Drawing Sheet

METHOD FOR REPAIRING A RUPTURE IN A METAL OR PLASTIC SURFACE

FIELD OF THE INVENTION

This invention relates to a new method of repairing ruptured surfaces in which the edges of the rupture are spaced from each other. More specifically it relates to the method of covering the rupture with a thin flexible cover sheet and applying a sealant along the edges of said cover sheet. Still more specifically, this invention relates to such a method in which the sealant is a cyanoacrylate and shortly thereafter applying a material, preferably a powdered solid material having hydroxyl and/or carboxylate groups therein, or a powdered rubber or a mixture of the two.

DESCRIPTION OF THE PRIOR ART

Applicant's copending application Ser. No. 06/747,326, filed June 21, 1985, issued on Apr. 21, 1987, as U.S. Pat. No. 4,659,589, describes and covers a process for sealing cuts, holes, ruptures, etc., in various sheet materials by applying a layer of an alkyl alpha-cyanoacrylate over the cut, etc., and then applying over the surface of this layer a layer of a powdered solid material having hydroxyl and/or carboxylate groups therein, such as a polysaccharide, e.g., alginate, guar gum, etc. Another application, Ser. No. 07/000,195, filed on Jan. 2, 1987 by Dr. Thieo Hogen-Esch, describes and covers a similar process in which the powdered material added to the surface of the cyanoacrylate layer is a powdered rubber. including a powdered reclaimed rubber, or a mixture of a powdered rubber with one of the powdered solid materials described in above mentioned application Ser. No. 06/747,326.

However, while the above described processes are very effective in sealing cuts and ruptures in which the sides of the ruptures remain adjacent to each other they are not suitable for covering ruptures or cuts in which there is a substantial space or opening between the side walls of the ruptures or cuts.

OBJECTS OF THE PRESENT INVENTION

It is an object of this invention to find a method for repairing gaping openings, cuts and ruptures in various surfaces.

It is an object of this invention to repair gaping openings, cuts and ruptures in container drums made of metal or various other materials.

SUMMARY OF THE INVENTION

In accordance with the present invention it has been found that gaping openings or cuts and ruptures in a material in which the side walls of the cut or rupture are spaced from each other by placing a thin, flexible sheet over the opening so that the sheet extends at least about 0.5 inch, preferably at least about one inch, beyond the opening and onto the surface of the material and then applying a layer of an alpha-cyanoacrylate over the edge of the sheet extending at least about 0.25 inch onto the thin sheet and at least about 0.25 inch onto the adjacent surface of the material in which the opening or rupture is present. Then onto this layer there is applied a layer of a powdered activating material such as described in the above-cited copending applications, namely an initiator having hydroxyl and/or carboxylate groups therein, such as a polysaccharide, or a powdered rubber or a combination of the two. This procedure is repeated one or more times after each layer has dried. The surface around the opening is cleared to remove dust or particles.

In repairing the rupture or gaping opening in a sheet or in a wall of a container drum, the thin flexible metal sheet is cut to an appropriate size and shape to fit over the opening and to lap over onto the surrounding surface of the sheet or drum for at least about 0.5 inch, preferably at least one inch, from the opening. While the thin sheet is held firmly in position one edge of the covering sheet is covered with a layer of the cyanoacrylate with the layer extending at least about 0.25 inch onto the lower sheet and at least about 0.25 inch onto the covering sheet. Immediately after applying the cyanoacrylate layer the powdered initiator is sprinkled onto the cyanoacrylate. This activates or initiates polymerization which increases the hardness of the cured cyanoacrylate. This is repeated for each side of the covering sheet. Then the whole procedure may be repeated one, two or more times. If desired the initial application of cyanoacrylate may be made to two or more sides of the cover sheet instead of the one side as described above. However, it is preferred to complete the cyanoacrylate layer and the initiator powder addition for one side of the cover sheet before proceeding to the next side.

The description of the process of this invention is facilitated by reference to the accompanying drawings.

Figure 1:
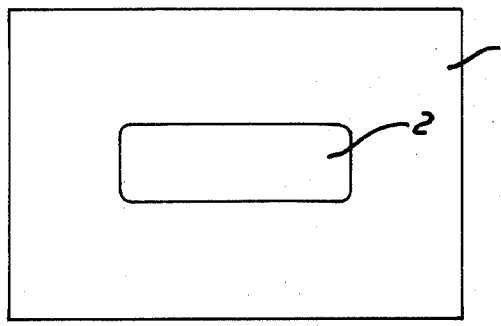
FIG. 1 shows a top veiw of a sheet or a cylindrical view of a drum with an open rupture or gaping hole therein.

While applicant does not wish to rely upon any particular mechanism or explanation of what reaction occurs during the hardening or sealing operation, it is believed that the activator or initiator promotes a chain reaction at the surface of the cyanoacrylate layer and the chain reaction proceeds downward through the thickness of the cyanoacrylate and effects hardening, possibly by further propagation of polymer molecules in the cyanoacrylate. In any case, the cyanoacrylate is hardened to effect the sealant function.

Initiators which are useful in the practice of this invention to effect curing through the layer of cyanoacrylate by external application to the surface of the cyanoacrylate include a wide variety of materials containing one or more hydroxyl and or carboxylate groups and also powdered rubber. These materials are preferably in solid, powdered form so that they will stay positioned on the surface of the cyanoacrylate Excess material may subsequently be brushed away after the curing or hardening is completed. These powders may be diluted with an inert material, such as an inactive powder, provided the concentration of active material is sufficient to provide the desired curing activity.

Preferred materials include but are not limited to carbohydrates, particularly saccharides, namely monosaccharides and poly-saccharides and other monomeric and polymeric materials containing hydroxyl and/or carboxylate groups. Polysaccharides such as alginates, xanthan gum, cellulose, various types of starch including (various types of flour), guar gum, gum arabic, pectin, cellulose, Lambda carrageenan, locust bean gum, sucrose, heparin, glycogen, amylose, amylopectin, maltose, isomaltose, chitin, etc. Suitable monosaccharides include glucose, fructose, aldose, aldonic acid, aldaric acid, alditol, uronic acid, tartaric acid, glucosides, etc.

Suitable polymeric materials containing hydroxyl or carboxylate groups also include polyvinylalcohol, hydrolyzed polyvinylacetate advantageously containing less than 75% and preferably containing less than 25% acetate groups, phenol-formaldehyde polymers having methylol groups

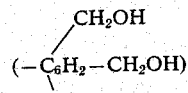

etc. Monomeric materials which are suitable include the dimethylol ethers of cyclohexane dimethanol bisphenol, etc., metal salts, such as the sodium salts of fumaric acid, itaconic acid, succinic acid, lauric acid, oleic acid, benzoic acid, phenylacetic acid, cylohexanecarboxylic acid, polymethacrylic acid, poly(acrylic acid), etc., monosodium salts, etc., of dibasic acids such as succinic acid, maleic acid, terephthalic acid, etc. The corresponding ammonium and substituted ammonium salts of these same acids are also suitable. Inorganic materials having hydroxyl or carboxylate groups such as diatomaceous earth are likewise suitable as initiators for the practice of this invention.

The expression "carboxylate" is used herein to designate various metal and ammonium salts of carboxylic acids. While any convenient metal can be used, the preferred metals are alkali metal and alkaline earth metals, preferably sodium, potassium, lithium, calcium, magnesium, barium, etc. The ammonium salts include various substituted ammonium compounds, such as the trimethyl ammonium, dimethyl ammonium, monomethyl ammonium, triethyl ammonium, phenyl ammonium, diphenlyammonium, triphenyl ammonium, cyclohexyl ammonium, dicyclohexyl ammonium, etc. As will be noted from the above illustrative compounds, the hydroxyl group is attached to an aliphatic carbon atom.

Powdered rubber materials include but are not limited to cis-1,4-polybutadiene, 1,2-polybutadiene, cis-1,4-polyisoprene, poly(chloroprene), butadiene-acrylonitrile copolymers, styrene-butadiene copolymers (both random and block copolymers), poly-(n-butylmethacrylate), terpolymers of butadiene, acrylonitrile and acrylic acid, etc. Powdered reclaimed rubber from used rubber products including tires is also suitable.

A particularly suitable material is a granular or ground reclaimed rubber from truck and bus tire tread, free of fabric and foreign material. This material has an approximate analysis of:
  Acetone extractable: 13-17%
  Ash Content: 5-7%
  Carbon Black Content: 29-33%
  Moisture Content: About 0.75%
  Natural Rubber Content: 20-30%
  Rubber Hydrocarbon: 29-45%
  Typical bulk density: 210 cc./100 g.

Such a reclaimed powdered rubber material is available from Baker Rubber, Inc. of South Bend, Ind. Three grades of varying particle size are:
  TP-20
  All passes through 16 mesh (USA Sieve)
  3% Retained on 20 mesh
  25% Retained on 30 mesh
  72% Passes through 30 mesh
  TP-30
  All passes through 20 mesh (USA Sieve)
  5% Retained on 30 mesh
  25% Retained on 40 mesh
  70% Passes through 40 mesh
  TP-40
  All passes through 20 mesh (U.S.A. Sieve)
  0.1% Retained on 30 mesh
  10% Retained on 40 mesh
  25% Retained on 50 mesh
  64.9% Passes through 50 mesh The alpha-cyanoacrylates useful in the practice of this invention are preferably liquid monomers having the formula $H_2C=C(CN)—COOR$ wherein R is an aliphatic, aromatic (preferably benzoid aromatic) or cylcoaliphatic hydrocarbon, having from 1 to 10 carbon atoms, preferably alkyl, for example, methyl, ethyl, propyl, isopropyl, butyl, isobutyl, amyl, pentyl, hexyl, heptyl, ethylhexyl, octyl, nonyl and decyl. From among these, it is particularly advantageous to employ those wherein R is alkyl having from 1 to 6 carbon atoms, either straight or branched chain. The aromatic and cycloaliphatic groups may have substituent groups, such as an alkyl having from 1 to 10 carbon atoms. The substituents are unlimited as long as the monomers are liquid. Illustrative substituents are lower alkoxy having from 1 to 4 carbon atoms [ethoxyethyl-alphacyanoacrylate] and halo, e.g., chloro and fluoro [trifluoro-isopropylalpha-cyanoacrylate]. In the trifluoro-isopropyl group the three fluorine atoms are preferably bonded to the same carbon atom. In addition, R can also be, for example, cyclohexyl, methylcyclohexyl, phenyl, tolyl, chlorophenyl, propargyl, butynyl, butenyl or allyl. The sole restrictions on R are that the monomer must be liquid at room temperature (20° C.) and atmospheric pressure and a carbon atom of R must be directly bound to the $H_2C=C(CN)—COO—$ group.

These alpha-cyanoacrylate monomers can contain any of the other compounding ingredients which are normally employed, such as, viscosity modifiers, coloring agents, fillers, pigments and the like.

Polymerization inhibitors such as sulfur dioxide may also be present. In lieu of sulfur dioxide other acidic inhibitors (against anionic polymerization), such as nitric oxide, nitrous oxide, carbon dioxide, p-toluene sulfonic acid, hydrogen fluoride, trichloroacetic acid and acetic anhydride, can be used to stabilize the monomer. Carbon dioxide is recommended only for monomers wherein R has at least four carbon atoms. In combination with the acidic inhibitor a free radical inhibitor, such as hydroquinone, monomethylether of hydroquinone, picric acid and t-butyl-catechol, pyrocatechol, p-methoxyphenyl and the like, may be concurrently employed. The monomethylether of hydroquinone is the preferred stabilizer against free radical polymerization. Moreover, it imparts good color stability to both the monomeric alpha-cyanoacrylate and the polymerized product therefrom. Free radical inhibition may be obtained with 10 parts of the monomethylether of hydroquinone per million parts of 1-cyanoacrylic acid ester, in practice from 15 to 200 parts per million are employed.

The free radical polymerization inhibitor, like the anionic polymerization inhibitor, is normally added during the processing of the alpha-cyanoacrylate ester. Hence, a free radical polymerization inhibitor is generally introduced into the distillation vessel and the receiver to stabilize the ester in the synthesis thereof. As a result, commercially available alpha-cyanoacrylate esters may already contain a certain amount of a conventional free radical polymerization inhibitor such as those mentioned hereinabove.

There may also be present in the adhesive compositions of this invention various other optional ingredients including, for example, plasticizers and thickeners. Plasticizers improve the aging characteristics of the cured bonds by lessening the brittleness thereof. For the best performance the amount of plasticizer to be used should not exceed 20% by weight of the total composition. Suitable plasticizers include monofunctional and difunctional aliphatic esters of acids having 1 to 10 carbon atoms, such as, for example, dimethyl octyl sebacate and esters of malonic acid, difunctional aromatic esters, phosphates and phosphonates. Thickeners, which may be used in amounts of up to 25% by weight, depending in part on their degree of fluidity at room temperature, serve to increase the viscosity of the adhesives so that they may be more easily applied. Among the suitable thickeners for this purpose are included, for example, polymeric alkyl alpha-cyanoacrylates, cellulose esters including cellulose acetate butyrate, acrylate resins such as poly(methyl methacrylate) and poly(ethyl methacrylate), and poly(vinyl alkyl ethers) such as poly(vinyl methyl ether).

While it is generally preferred to add the cyanoacrylate layer to one edge of the patch and adjacent areas extending at least 0.25 inch on the patch and at least 0.25 inch on the drum or sheet being patched so that the patch will be held in position while the cyanoacrylate and powder are being added to the other edges of the patch, it is also suitable to apply the cyanoacrylate to all four edges, or in the case of a non-rectangular patch all the way around the patch before the powder is added.

It is generally considered not necessary to apply any cyanoacrylate to the underside of the patch or on the area of the drum adjacent to the rupture so that there will be cyanoacrylate between the patch and the drum surface. However this may be done if desired. In some cases where the drum area around the rupture is rough or dirty it may be desirable to put a drop of cyanoacrylate at the corners of the side of the patch to be placed against the drum surface to aid in holding the patch in position while the edges and adjacent areas are covered with cyanoacrylate and powder.

After the powder is applied, the cyanoacrylate layer is given at least 2 minutes for curing and drying before testing is performed. This applies to metal patches and metal containers or sheets. Where the patch or the drum or sheet being patched is a plastic material it is generally desirable to allow at least about 5 minutes before testing the patch.

A type of patch preferred is one cut from thin carbon steel (about 0.011 inch in thickness) having a chrome coating on one side and a plastic film coating on the other side. This is the type of material used for making cans which are to be filled with fruit juices. The plastic coated side is positioned over the rupture and the chrome plated side faces toward the outside of the drum or away from the rupture.

Various other materials may be used for the patches, such as uncoated steel, aluminum, and rubber or plastic sheeting. The plastic sheeting may be of various types as listed below for use in the drums or other containers and sheets to be repaired. It is only necessary that the patch material is flexible enough, where necessary to conform to the contour of the drum or sheet being repaired.

The drums or other containers or sheets which have a rupture may be made of various materials such as uncoated or coated or painted steel of various types, aluminum, polyvinylchloride (PVC), polypropylene, nylon, polyester(polyethylene terephthalate), polycarbonate, polystyrene, etc.

After the patch on a container has been sufficiently cured and dried, the patch may be tested by filling the container with liquid, preferably of the type with which the container is subsequently to be filled. Then the container is positioned so that the full weight of the container contents will be exerted against the patch. The underside of the container is examined periodically to determine if there is any leakage. The patch should be thus tested for at least 24 hours. Various liquids that can be used in the testing include water, oils, paint, glue, adhesives, etc. Where the patch is applied to a rupture in a sheet material, the testing may be performed by placing the sheet under a water faucet with the rupture facing upward and the patch downward and allowing water from the faucet to run with considerable force for a substantial period of time onto the inside of the patch.

While rectangular ruptures are shown in the drawings, the rupture is generally not of any regular shape and may also be oblong, circular, or any shape produced by the accident causing the rupture.

SPECIFIC EMBODIMENT OF THE INVENTION

Figure 2:
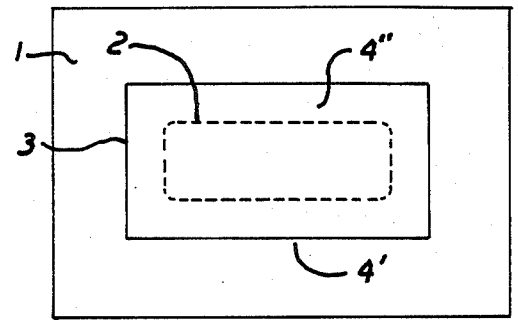
FIG. 2 shows a similar view as in FIG. 1 with a cover of a thin flexible metal sheet positioned over the rupture and overlapping the adjacent surface of the base sheet or drum.
Figure 3:
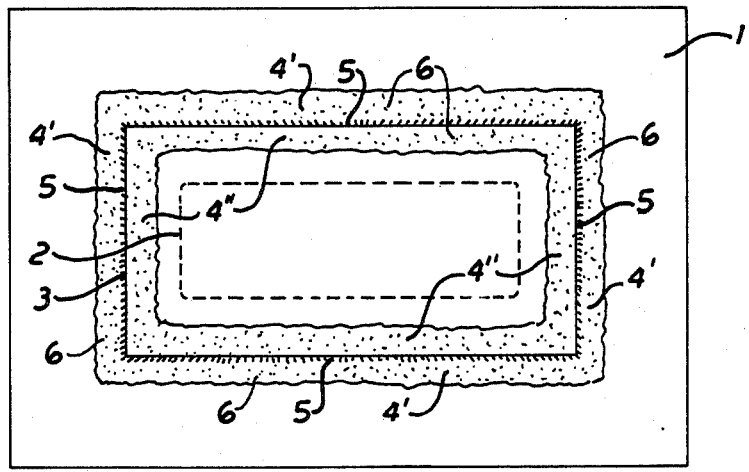
FIG. 3 shows a similar view as in FIG. 2 in which a layer of cyanoacrylate has been applied to the edges of the cover sheet and adjacent areas of the cover sheet and of the base sheet or drum surface, and activator powder has been added to the layer.

FIGS. 1-3 illustrate the method of this invention. In FIG. 1, base sheet or container drum wall 1 has an open rupture 2 therein. In FIG. 2, thin metal cover sheet 3 is positioned over the rupture 2 with overlapping of adjacent areas of base sheet 1.

In FIG. 3, a layer of cyanoacrylate glue 4 is shown applied over the edges 5 of cover sheet 3. The glue layer extends over adjacent area 4' (See FIG. 2) of base sheet 1 and over adjacent area 4" (FIG. 2) of cover sheet 3. The initiator or activator powder 6 is shown spread over the cyanoacrylate layer 4.

The following examples illustrate the practice of this invention and are not to be regarded as limiting the scope of the invention or the manner in which it may be practiced. Unless specified otherwise parts and percentages are by weight.

EXAMPLE I

A painted steel drum (55 gallons capacity) having a hole in the cylindrical surface thereof near the lower end of the drum about 5 inches long and 2 inches wide is repaired in the following manner:

The area around the hole is thoroughly cleaned with acetone. A thin, flexible metal patch is used to cover the hole to about 1½" to 2½" beyond the hole on all sides. After the metal patch is properly fitted over the hole, a thin film of the cyanoacrylate (Super Glue) is applied over the edge of the patch on one side, extending about ¼" onto the drum and about ¼" on the cover. Firmly holding the patch in place, a 50—50 mixture of TP-30 reclaimed rubber powder and guar gum is applied liberally over the liquid. This same method is repeated for each of the other sides of the metal patch, proceeding one side at a time. After all 4 sides of patch have been sealed and 3 to 5 minutes has transpired since completing the last side, excess powder is wiped away from all sides by using a clean dry cloth or a paper towel. Then the procedure of applying cyanoacrylate and then the powder is repeated twice.

While one or two coats are capable of providing sufficient sealing it is preferred to apply a total of three coats to insure that all openings around patch have been sealed, thus preventing seepage. After the last layer has dried and the excess powder has been wiped away, the drum is filled with oil and the drum is positioned on its side with the sealed portion on the bottom. No seepage occurs. The drum is kept in this position for about 24 hours with periodic checking for seepage. The drum is then stood on its lower end so as to allow full pressure against the seal. After two days in this position there is no seepage from the seal observed.

EXAMPLE Ia

The procedure of Example I is repeated except that the powder is omitted after the application of each layer of cyanoacrylate. Upon testing leakage occurs.

EXAMPLE II

Similar satisfactory results are obtained when the procedure of Example I is repeated using in place of the Super Glue cyanoacrylate the following cyanoacrylates used individually:
 (a) A 50—50 mixture of methyl and ethyl alpha-cyanoacrylate;
 (b) Butyl alpha-cyanoacrylate;
 (c) Hexyl alpha-cyanoacrylate;
 (d) Phenyl alpha-cyanoacrylate; and
 (e) Cyclohexyl alpha-cyanoacrylate.

EXAMPLE III

The procedure of Example I is repeated a number of times with equally satisfactory results using respectively the following initiator powders in place of that used in Example I:
 (a) Alginate
 (b) Xanthate gum
 (c) Diatomaceous earth
 (d) Pectin
 (e) Guar Gum
 (f) Gum arabic
 (g) Polyvinylacetate (25% hydrolyzed)
 (h) Corn starch
 (i) Lambda Carcageenan
 (j) Monosodium salt of succinic acid
 (k) Monoammonium salt of fumaric acid
 (l) TP-30
 (m) TP-40
 (n) Cis-1,4-Polyisoprene(vulcanized & stabilized)
 (o) Hycar 1422
 (p) 50% TP-20 and 50% Alginate
 (q) 50% TP-30 and 50% Alginate
 (r) 50% TP-40 and 50% Alginate
 (s) 75% TP-20 and 25% Guar Gum
 (t) 75% TP-30 and 25% Guar Gum
 (u) 75% TP-40 and 25% Guar Gum
 (v) 50% TP-20 and 50% Starch
 (w) 50% TP-30 and 50% Pectin
 (x) 50% TP-40 and 50% Gum Arabic

EXAMPLE IV

The procedure of Example I is repeated a number of times with equally satisfactory results using respectively in place of the painted metal drum a number of other containers having approximately the same size rupture or opening:
 (a) a 5-gallon unpainted steel container;
 (b) an unpainted 55 gallon steel drum;
 (c) a polyvinylchloride (PVC) plastic drum (40 gallons);
 (d) a fiberglass cardboard drum (40 gallons); and
 (e) a 5-gallon unpainted aluminum container

EXAMPLE V

The procedure of Example I is repeated a number of times using respectively in place of the steel drum a number of sheets of the following materials in which there is in each case a rupture of the size and shape used in FIG. 1:
 (a) Polypropylene;
 (b) Nylon;
 (c) Polyethyleneterephthalate;
 (d) Polycarbonate; and
 (e) Polystyrene In each case the patched sheet is supported under a water faucet with the rupture facing upward and a stream of water is directed with force against the patch for 5 minutes. The patch is then turned over to determine whether any leakage has occurred. In each case, the patch is found to be leakproof.

EXAMPLE VI

The procedure of Example I is repeated a number of times with satisfactory results using respectively patches cut from flexible sheets of the following:
 (a) Polypropylene;
 (b) Nylon;
 (c) Polyethyleneterephthalate; and
 (d) Polycarbonate

EXAMPLE VII

The procedure of Example V is repeated a number of times with similar results using in place of the flexible steel patch a patch of material similar to that of the ruptured sheet, namely:
 (a) Polypropylene;
 (b) Nylon;
 (c) Polyethyleneterephthalate;
 (d) Polycarbonate; and
 (e) Polystyrene The process of this invention is particularly valuable with respect to ruptures which occur after a drum or other container has been filled with the liquid which it is to transport or store. In other cases a defect in a seam of the container or a pinhole may not be apparent until the container is filled with a liquid. Where the opening through which the leakage occurs is small and has less than ⅛ inch space between opposing edges the opening may be repaired by the processes described in the aforementioned patent applications. However where the opening provides a space of ⅛ inch or more between opposing edges of a rupture it is much more efficient to apply a patch as described herein. There is no upper limit to the size of the rupture that can be repaired by this method although repair of ruptures having a dimension of more than one foot rarely occurs.

Many of the ruptures occurring to drums during transit occur by accidents with a forklift or "hi-low" whereby a prong of the forklift may puncture a wall of the drum to cause a rupture generally about 1–2 inches wide and about 5–8 inches long. In many cases a drum may be dropped or bumped in another manner to produce sizable ruptures. In such cases the patch method of repair is easily and quickly applied to repair the drum with the contents kept intact by positioning the drum so that the rupture is located at the top of the drum which reduces loss of liquid. The drum is then repaired and, after adequate curing of the patch, the drum may be repositioned for completing transportation to its destination. Obviously the importance of this method of patching becomes apparent in the avoidance of loss of valuable cargo.

In a few cases the contents of a drum may be corrosive to the cured cyanoacrylate sealing composition and the effective life of the patch may be shortened. For example, a washing composition used for washing trucks is quite acidic and within an hour there may be a small amount of seepage. However most of the contents is retained in the drum. If the drum is stood in a retaining vessel the small amount of seepage resulting during transportation can be saved as well as the major part of the contents retained in the drum.

Another material transported in drums (Herculon D) has an acid base which after 4-5 days may cause seepage through the patch. However even in such cases only a small amount of the contents seep through and in some cases do not require a retaining vessel as described immediately above.

Also epoxy-cardboard drums may develop slow leaks about 5-6 hours after a patch is applied. Here again the seepage is very slow and only a small amount escapes, which if desired may be recovered in a retaining vessel.

Even in these cases the repair method of this invention is a valuable asset for avoiding the loss of cargo during transportation and where there is not such seepage the repaired drum may be used repeatedly without additional repair.

Where the expression "rupture" is used hereinafter it is intended to include various types of openings described herein.

While it is preferred that the powdered solid should be added to the surface of the cyanoacrylate immediately after applying the cyanoacrylate layer or within 60 seconds, it is possible that this powder addition may be delayed a brief time provided that the cyanoacrylate layer is still wet or tacky which may be as long as 7 minutes. Once the cyanoacrylate surface has stiffened or hardened the addition of the powder is less effective and possibly completely ineffective.

While certain features of this invention have been described in detail with respect to various embodiments thereof, it will of course be apparent that other modifications can be made within the spirit and scope of this invention, and it is not intended to limit the invention to the exact details insofar as they are defined in the following claims.

The invention claimed is:

1. A method for repairing a rupture in a metal or plastic surface in which opposing edges of said rupture are spaced at least ⅛ inch from each other comprising the steps of:
   (a) applying over said rupture a covering patch of metal or plastic sheet material of appropriate size and shape to cover the said rupture and to cover at least ½ inch of the area of said surface and adjacent to said rupture;
   (b) applying over the edge of said covering patch a layer of an alpha-cyanoacrylate being liquid at 20° C. and having the formula $CH_2=C(CN)-COOR$ wherein R is a hydrocarbon radical selected from the group consisting of aliphatic, aromatic and cycloaliphatic hydrocarbon groups of 1-10 carbon atoms and alkoxy, chloro and fluoro derivatives of said hydrocarbon groups in which alkoxy groups there are 1-4 carbon atoms therein, said layer covering the adjacent areas of said covering patch and said ruptured surface each for a distance of at least ¼ inch from the edge of said covering patch and all around said patch; and
   (c) spreading on said layer of alpha-cyanoacrylate a layer of a powdered solid selected from the group consisting of (i) a compound having hydroxyl, carboxylate or both hydroxyl and carboxylate groups therein and (ii) rubber.

2. The process of claim 1 in which said powdered solid is applied while the surface of said cyanoacrylate layer is still wet.

3. The process of claim 1 in which said powdered solid is applied within 60 seconds after the said cyanoacrylate layer is applied.

4. The process of claim 2 in which said rupture is in a wall of a metal container.

5. The process of claim 2 in which said rupture is in a wall of a steel drum.

6. The process of claim 2 in which said rupture is in a plastic container.

7. The process of claim 6 in which said plastic is selected from the group consisting of polyvinylchloride, polypropylene, nylon, polyethyleneterephthalate, polycarbonate and polystrene.

8. The process of claim 5 in which said R group is an alkyl group of 1-6 carbon atoms.

9. The process of claim 8 in which said powdered solid is a carbohydrate.

10. The process of claim 8 in which said powdered solid is a saccharide.

11. The process of claim 10 in which said saccharide is a monosaccharide.

12. The process of claim 10 in which said saccharide is a polysaccharide.

13. The process of claim 12 in which said polysaccharide is an alginate.

14. The process of claim 12 in which said polysaccharide is a starch.

15. The process of claim 12 in which said polysaccharide is pectin.

16. The process of claim 12 in which said polysaccharide is carrageenan.

17. The process of claim 12 in which said polysaccharide is locust bean gum.

18. The process of claim 8 in which said powdered solid is selected from the group consisting of alginate, pectin, starch, cellulose, locust bean gum, xanthate gum, dextran, guar gum, gum arabic, Na bicarbonate, polyvinylalcohol, a vinylalcohol-vinylacetate copolymer having at least 25% vinylalcohol groups therein, sodium bicarbonate, a sodium salt of polyacrylic acid, a sodium salt of polymethacrylic acid, an ammonium salt of polyacrylic acid and an ammonium salt of polymethacrylic acid.

19. The process of claim 18 in which said alpha-cyanoacrylate is the methyl ester.

20. The process of claim 18 in which said alpha-cyanoacrylate is the ethyl ester.

21. The process of claim 18 in which said alpha-cyanoacrylate is a mixture of the methyl and ethyl esters.

22. The process of claim 18 in which said alpha-cyanoacrylate is a butyl ester.

23. The process of claim 18 in which said alpha-cyanoacrylate is a propyl ester.

24. The process of claim 21 in which said powdered solid is selected from the group consisting of monosaccharides and polysaccharides.

25. The process of claim 22 in which said powdered solid is selected from the group consisting of alginate, starch, pectin, carrageenan, locust bean gum, guar gum, cellulose, gum arabic, xanthate gum, sodium bicarbonate, polyvinyl alcohol, vinylalcohol-vinylacetate copolymer having at least 25 percent by weight of vinylalcohol groups therein, sodium salt of polyacrylic acid, sodium salt of polymethacrylic acid, ammonium salt of polyacrylic acid and ammonium salt of polymethacrylic acid.

26. The process of claim 22 in which said powdered solid is alginate.

27. The process of claim 22 in which said powdered solid is guar gum.

28. The process of claim 23 in which said powdered solid is starch.

29. The process of claim 22 in which said powdered solid is pectin.

30. The process of claim 22 in which said powdered solid is gum arabic.

31. The process of claim 25 in which said alpha-cyanoacrylate is the methyl ester.

32. The process of claim 25 in which said alpha-cyanoacrylate is the ethyl ester.

33. The process of claim 25 in which said alpha-cyanoacrylate is a mixture of the methyl and ethyl esters.

34. The process of claim 25 in which said alpha-cyanoacrylate is a butyl ester.

35. The process of claim 25 in which said alpha-cyanoacrylate is a propyl ester.

36. The process of claim 8 in which said solid is a powdered rubber selected from the group consisting of natural rubber, cis-1,4-polybutadiene, 1,2-polybutadiene, cis-1,4-polyisoprene, poly(chloroprene), butadiene-acrylonitrile copolymer, random and block copolymers of styrene and butadiene, poly-(n-butyl-methacrylate) and terpolymers of butadiene, acrylonitrile and acrylic acid.

37. The process of claim 36 in which said powdered rubber is a reclaimed rubber.

38. The process of claim 36 in which said powdered rubber is natural rubber.

39. The process of claim 36 in which said powdered rubber is cis-1,4-polybutadiene.

40. The process of claim 36 in which said powdered rubber is 1,2-polybutadiene.

41. The process of claim 36 in which said powdered rubber is cis-1,4-polyisoprene.

42. The process of claim 36 in which said powdered rubber is poly(chloroprene).

43. The process of claim 36 in which said powdered rubber is butadiene-acrylonitrile copolymer.

44. The process of claim 36 in which said powdered rubber is selected from the group consisting of random and block copolymers of styrene and butadiene.

45. The process of claim 36 in which said powdered rubber is poly-(n-butylmethacrylate).

46. The process of claim 36 in which said powdered rubber is a terpolymer of butadiene, acrylonitrile and acrylic acid.

47. The process of claim 36 in which said powdered rubber contains mixed intimately therein 0–95 percent by weight of a powdered solid having hydroxyl, carboxylate or both hydroxyl and carboxylate groups therein.

48. The process of claim 36 in which said powdered rubber comprises an intimate mixture of 25–75 percent by weight of said powdered rubber and 25–75 percent by weight of a powdered solid having hydroxyl, carboxylate or both hydroxyl and carboxylate groups therein.

49. The process of claim 48 in which said powdered solid is selected from the group consisting of monosaccharides and polysaccharides.

50. The process of claim 48 in which said powdered solid is selected from the group consisting of alginate, starch, pectin, carrageenan, locust bean gum, guar gum, cellulose, gum arabic, xanthate gum, sodium bicarbonate, polyvinyl alcohol, vinylalcohol-vinylacetate copolymer having at least 25 percent by weight of vinylalcohol groups therein, sodium salt of polyacrylic acid, sodium salt of polymethacrylic acid, ammonium salt of polyacrylic acid and ammonium salt of polymethacrylic acid.

51. The process of claim 48 in which said powdered solid is alginate.

52. The process of claim 48 in which said powdered solid is guar gum.

53. The process of claim 48 in which said powdered solid is starch.

54. The process of claim 48 in which said powdered solid is pectin.

55. The process of claim 48 in which said powdered solid is gum arabic.

56. The process of claim 50 in which said alpha-cyanoacrylate is the methyl ester.

57. The process of claim 50 in which said alpha-cyanoacrylate is the ethyl ester.

58. The process of claim 50 in which said alpha-cyanoacrylate is a mixture of the methyl and ethyl esters.

* * * * *